(No Model.)
S. STRAHAN.
ORNAMENTAL BALUSTER AND SPINDLE.
No. 349,669. Patented Sept. 21, 1886.
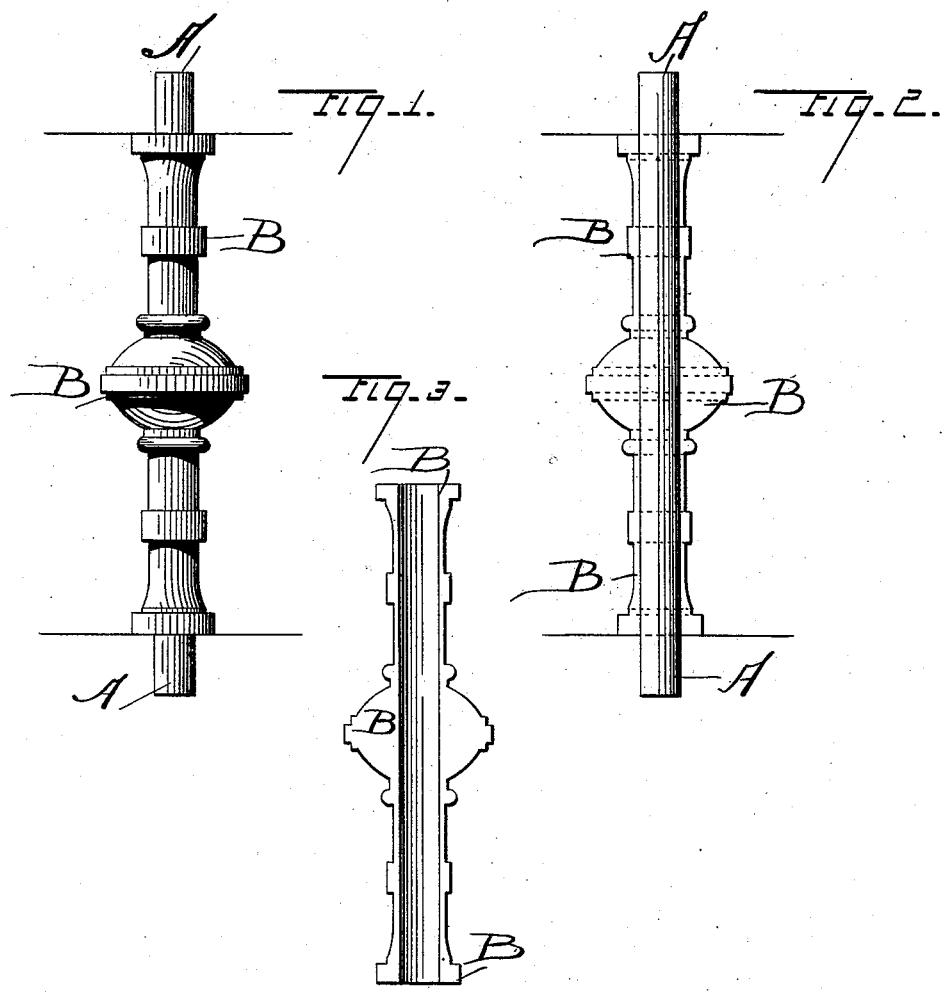
Witnesses
A. S. Pare
George C. Cook.
Inventor
Simon Strahan,
By Banning & Banning,
Attorneys

UNITED STATES PATENT OFFICE.

SIMON STRAHAN, OF CHICAGO, ILLINOIS.

ORNAMENTAL BALUSTER AND SPINDLE.

SPECIFICATION forming part of Letters Patent No. 349,669, dated September 21, 1886.

Application filed June 29, 1886. Serial No. 206,645. (No model.)

*To all whom it may concern:*

Be it known that I, SIMON STRAHAN, a citizen of the United States, residing at Chicago, Illinois, have invented certain new and useful Improvements in Ornamental Balusters and Spindles, of which the following is a specification.

The object of my invention is to combine wood and various kinds of plastic material in the manufacture of ornamental balusters and spindles used in open or screen work in furniture, buildings, &c.; and the invention consists in the features and details of construction, hereinafter described and claimed.

In the drawings, Figure 1 is a side elevation of a spindle made according to my improvement. Fig. 2 is a longitudinal sectional view of the same, showing the wooden core or center piece in place, and Fig. 3 is a view of the same with the wooden core or center piece removed.

A is the wooden center or core, and B the composition.

Heretofore in balusters and ornamental open-work in furniture, and over doors and around the porticoes of buildings, and in other places where such work is usually employed, the spindles or pieces have been turned or cut out of wood in lathes or other kind of machinery. In many cases where particularly fine effect was desired the ornamental portions of them have been carved by hand; but however made much time, expense, and loss of material, where wood was cut away, have been required. In the manufacture of my combined wood and composition spindle all these difficulties are obviated. I take a stick of wood of the length and size desired for the core or dowel of my spindle, baluster, &c. This core of wood is intended to impart strength and stability to the spindle, and need therefore be only of a size necessary for that purpose, and, if desired, a metal rod may be employed in its place. I then take molds, preferably of two parts, an upper and a lower, containing a cavity of the length and thickness intended for a spindle or baluster. This cavity in the mold is made of various shapes, so that the finished product will have an external configuration corresponding to any shape desired. The core or dowel is then placed in the molds and supported therein in any way, so as to leave a space around it, into which the composition may be pressed. The molds are then filled with composition and brought together, so that all of the space around the core will be packed firmly and completely with the plastic material. This material unites, so that when it is hardened and the molds are removed it will appear homogeneous and solid throughout. If preferred, the molds may first be filled with the composition, which may be that ordinarily used by gilders, gutta-percha, or any other material adapted to receive impressions in the plastic state, and retain them when hardened or solid, and the core then placed in position and the molds brought together, so that it will be forced into the composition instead of putting it into the molds first and forcing the composition around it. As above said, any kind of plastic material may be employed, though I prefer to use ordinary gilders' composition, as I can impart a high degree of polish to the spindles manufactured out of it, and any kind of core or dowel may be used so long as the requisite strength and stability are secured.

The invention consists not in the composition of which the external portion of the spindles are made, nor of the cores by which they are made strong and serviceable, but in the combination of the two, by which I am enabled to manufacture spindles for screen and other open work, which, while highly ornamental, are yet economical and easy of construction.

What I claim as new, and desire to secure by Letters Patent, is—

As a new article of manufacture, an ornamental baluster or spindle, comprising a wood or metal core or dowel and an external part or covering pressed or molded around the same in any desired form, substantially as described.

SIMON STRAHAN.

Witnesses:
FRANK L. DOUGLAS,
E. F. HUBBARD.